US010230633B2

(12) United States Patent
Leitner (10) Patent No.: US 10,230,633 B2
(45) Date of Patent: Mar. 12, 2019

(54) SHARED MEMORY COMMUNICATION IN SOFTWARE DEFINED NETWORKING (71) Applicant: Red Hat, Inc., Raleigh, NC (US)

(72) Inventor: Flavio Leitner, Maringa (BR)

(73) Assignee: RED HAT, INC., Raleigh, NC (US)

(*) Notice: Subject to any disclaimer, the term of this patent is extended or adjusted under 35 U.S.C. 154(b) by 356 days.

(21) Appl. No.: 15/003,509

(22) Filed: Jan. 21, 2016

(65) Prior Publication Data
US 2017/0212864 A1 Jul. 27, 2017

(51) Int. Cl.
G06F 15/173 (2006.01)
H04L 12/741 (2013.01)
H04L 12/713 (2013.01)
H04L 12/931 (2013.01)

(52) U.S. Cl.
CPC .......... H04L 45/745 (2013.01); H04L 45/586 (2013.01); H04L 49/70 (2013.01)

(58) Field of Classification Search
USPC ....................................................... 709/238
See application file for complete search history.

(56) References Cited

U.S. PATENT DOCUMENTS

| 5,805,816 | A | * | 9/1998 | Picazo, Jr. | H04L 12/44 370/230 |
| 7,042,888 | B2 | * | 5/2006 | Berggreen | H04L 45/745 370/235 |
| 7,145,868 | B2 | * | 12/2006 | Giroux | H04L 12/5602 370/229 |
| 7,363,400 | B2 | * | 4/2008 | Tanaka | G06F 3/061 709/234 |
| 8,448,238 | B1 | | 5/2013 | Gupta et al. | |
| 8,675,664 | B1 | * | 3/2014 | Kamath | H04L 12/287 370/395.5 |
| 8,874,876 | B2 | | 10/2014 | Bhadra et al. | |
| 9,007,922 | B1 | | 4/2015 | Mittal et al. | |
| 9,112,794 | B2 | | 8/2015 | Agarwal et al. | |
| 9,166,929 | B1 | * | 10/2015 | Kamath | H04L 12/287 |
| 9,379,973 | B2 | * | 6/2016 | Mekkattuparamban | H04L 49/70 |
| 9,454,392 | B2 | * | 9/2016 | Luxenberg | G06F 9/45533 |
| 9,471,384 | B2 | * | 10/2016 | Messerli | G06F 9/45533 |
| 9,485,144 | B2 | * | 11/2016 | Phaal | H04L 41/0823 |

(Continued)

OTHER PUBLICATIONS

Perrin et al., "Practical Implementation of SDN & NFV in the WAN", https://networkbuilders.intel.com/docs/HR-Intel-SDN-WP.pdf, Senior Analyst, Heavy Reading, White Paper, published on Oct. 2013, 11 pages.

(Continued)

*Primary Examiner* — Alicia Baturay
(74) *Attorney, Agent, or Firm* — Womble Bond Dickinson (US) LLP; Daniel E. Ovanezian (57) ABSTRACT

A virtual switch executes on a computer system to forward packets to one or more destinations. A method of the disclosure includes receiving, by a virtual switch application being executed by a processing device, a packet comprising a header, determining, that the packet does not match a distribution table associated with the virtual switch and storing, by the processing device, the packet to a shared memory buffer that is accessible to a network controller application being executed by the processing device.

20 Claims, 4 Drawing Sheets

(56) References Cited

U.S. PATENT DOCUMENTS

| | | | |
|---|---|---|---|
| 9,596,192 B2* | 3/2017 | DeCusatis | H04L 49/9057 |
| 9,614,789 B2* | 4/2017 | Zhu | H04L 49/70 |
| 9,619,270 B2* | 4/2017 | Ramasubramanian | G06F 9/45558 |
| 9,654,396 B2* | 5/2017 | Kothari | H04L 45/7453 |
| 9,781,209 B2* | 10/2017 | Ergin | H04L 67/1097 |
| 9,794,107 B2* | 10/2017 | Gaglianello | H04L 61/2084 |
| 9,800,503 B2* | 10/2017 | Janakiraman | H04L 47/122 |
| 9,838,277 B2* | 12/2017 | Raney | H04L 43/028 |
| 9,860,189 B2* | 1/2018 | Butcher | H04L 47/78 |
| 9,983,996 B2* | 5/2018 | Bernat | G06F 12/0833 |
| 2013/0266007 A1 | 10/2013 | Kumbhare et al. | |
| 2014/0177634 A1 | 6/2014 | Jiang et al. | |
| 2014/0325038 A1 | 10/2014 | Kis | |
| 2015/0172208 A1 | 6/2015 | DeCusatis et al. | |
| 2015/0370586 A1* | 12/2015 | Cooper | G06F 9/45533 710/308 |
| 2017/0214612 A1* | 7/2017 | Leitner | H04L 45/586 |

OTHER PUBLICATIONS

Pfaff et al., "The Design and Implementation of Open vSwitch", http://blog.acolyer.org/2015/05/13/the-design-and-implementation-of-open-vswitch/, the morning paper, published on May 13, 2015, 4 pages.

Baudin, OVS and L7 classification (DPI) use cases and demos—OVS Conference 2015, https://www.youtube.com/watch?v=TzUycajigu8, Published on Nov. 20, 2015, Qosmos, Open vSwitch.

Baudin, OVS and L7 classification (DPI), Demo part 1: L7 Firewall, L7 QoS, Demo part 2:L7 Service Chaining, http://www.openvswitch.org/support/ovscon2015/16/1330-baudin.pptx>, Open vSwitch conference, Nov. 2015, 35 pages, QOSMOS.

* cited by examiner

SHARED MEMORY COMMUNICATION IN SOFTWARE DEFINED NETWORKING

TECHNICAL FIELD

Aspects of the present disclosure relate to virtual networks, and more particularly, to software defined networking.

BACKGROUND

A computer network may include various computing devices that may communicate with one another through network switches and other network devices. Certain components in a software defined network may perform data path functions while others perform control path functions.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a method and system for operating a software defined network (SDN). SDN herein refers to systems and method implementing an architecture that decouples the network control and forwarding functions, thus enabling the network control to become directly programmable and the underlying infrastructure to be abstracted for applications and network services. In certain implementations, SDN separates the control plane of a network from the data plane of the network. The control plane of the network sets policies that control the flow of traffic through components of the network. Components in the data plane of the network use the policies set by the control plane to distribute traffic in the network. The control plane of an SDN may include a network controller that sets the policies of the network and provides the policies to components in the data plane. The network controller in an SDN may be operated at a single network location to provide control of switches throughout the network or may be co-located with a switch to reduce latency in instructions from the controller to the switchers.

Some components in the data plane of an SDN may be network switches that receive packets and forward them based on the contents of the packet. Switches may determine how to distribute packets based on a distribution table that includes entries that may match components of a packet. Switches may inspect the header of a packet to determine if the header of the packet matches an entry in the distribution table. In some SDNs one or more switches may be implemented as virtual switches. A virtual switch provides a software emulation of a physical switch. In an illustrative example, virtual switches may provide communication with virtual machines through virtual rather than physical switches. The virtual machines interface with the virtual switch through ports on the virtual switch and virtual network interface cards of the virtual machines. The virtual switch may forward communications from a virtual machine to another location on the virtual network such as another virtual machine. The virtual switch may also connect to a physical network interface card to provide access to a physical network for the virtual machines.

A virtual switch operating on a computer system may have a distribution table including various entries that define packet forwarding rules. As a packet is received by the virtual switch, it is analyzed by the virtual switch to determine if certain fields of the packet match one or more parameters in the matching table. If a matching entry is identified, the switch performs an action specified by the entry. For example, the distribution table may have an entry indicating a port for forwarding the packet if it matches the parameters of the entry. In certain situations, a packet may match more than one entry in a distribution table. The virtual switch may determine which rule to implement if a packet matches multiple entries in a distribution table based on priorities of the entries. For example, each entry in a distribution table may have an associated priority. In some implementations, a virtual switch may have more than one distribution table. A virtual switch may apply multiple distribution tables in a logical order based on matching and actions taken according to a previous distribution table in a chain of distribution tables.

A virtual switch may receive some packets that do not match an entry in a distribution table. If the virtual switch does not have an entry matching a particular packet, the packet may be forwarded to a network controller to determine how to process the packet. The virtual switch may also forward packets to the network controller if the packets match an entry in a distribution table that indicates to the switch to forward the packets to the network controller. The network controller may have access to additional rules or policies that are not available to the switch. For example, the network controller may receive instructions from various applications that describe policies for the network. The network controller may also have information on network parameters of additional components of the network. Thus, the network controller may make a determination on how to process a packet and return the packet and directions for processing the packet back to the switch. In certain situations, the network controller may send a modified packet to the virtual switch, a new packet to the virtual switch, or may not send a packet to the virtual switch. Passing a packet from the virtual switch to the network controller may increase latency in the data path of the packet, increase the load on a computer system operating the virtual switch, and reduce throughput by the physical network.

In order to reduce the communication latency between a virtual switch and a network controller and increase throughput of the physical network components, the network controller may be executed on the same computer system as the virtual switch. Thus, the virtual switch may forward packets to the network controller without sending the packet over a network. For example, the network controller may be executed as an application or a virtual machine on the local computer system. The virtual switch may communicate with the network controller by sending packets to a virtual network interface card associated with a virtual machine executing the network controller application. In some implementations, the computer system may execute the network controller as an application in the user-space of a host computer system and the virtual switch may forward packets to the network controller through a socket or a shared file. However, sending a packet to a network controller operating on a virtual machine or through a socket may incur several context switches. For example, the operating system may perform a context switch from the user space to the kernel space and back to the user space to send a packet from the virtual switch to the network controller. Context switches incurred in communications between the virtual machine and the network controller may cause delays in the processing of packets by the network controller, which may affect the performance of the network environment and services relying on the network.

To provide a fast data path from the virtual switch to the local network controller, the virtual switch may communicate with the network controller through a shared memory space in which one or more shared memory buffers may be allocated. For example, the virtual switch may store a packet that doesn't match an entry in a distribution table or matches an entry in the distribution table that indicates that packet is to be forwarded to the network controller into a shared memory buffer and provide a notification to the network controller that the packet has been stored. The network controller may then determine a destination for the packet and return the packet to the virtual switch through the shared memory space. The network controller may modify or append the packet with directions for the virtual switch to forward the packet in a specific manner. For example, the network controller may include a direction to forward the packet to a specific port. The virtual switch may then forward the packet as indicated by the network controller. The virtual switch may also update its distribution table such that the next packet with a similar heading will match a rule provided by the network controller. Thus, the virtual switch may forward subsequent packets matching the new rule without communication with the network controller. In some implementations, the network controller may instead update a distribution table for the virtual switch to include an entry that matches the packet.

The virtual switch and the network controller may both read to and write from a shared memory buffer. The computing system executing the network controller may generate a file descriptor for the shared memory buffer that indicates when the virtual switch or network controller stores a packet to the shared memory. For example, a host operating system of the computing system may include a set of file descriptors for files open in the system. The host operating system may include a file descriptor for the shared memory buffer accessible to the virtual switch or network controller. As data is written to or read from the shared memory the file descriptor may be update to notify other components operating on the host computing system. For example, the virtual switch may alter a bit in a file descriptor when a packet is forwarded to the network controller over the shared memory. When the packet is read by the network controller, the network controller may modify the file descriptor or return the file descriptor to a state it was in before modified by the virtual switch. The network controller may also modify the file descriptor when a packet is analyzed and returned to the shared memory for the virtual switch. For example, the network controller may alter a bit in the file descriptor indicating data is written to the shared memory.

The network controller and the virtual switch may each monitor the file descriptor to determine when a packet is available. For example, the network controller and virtual switch may poll the file descriptor to determine when a packet is stored to the shared memory. Communicating between the virtual switch and the network controller through shared memory removes latency involved with sending the packet to a remote network location and latency from context switches performed when forwarding the packet to a virtual machine, through a socket, or by other methods of communication.

In the following description, numerous details are set forth, however, the present invention may be practiced without these specific details. In some instances, structures and devices are shown in block diagram form, rather than in detail, in order to avoid obscuring the present invention.

Figure 1:
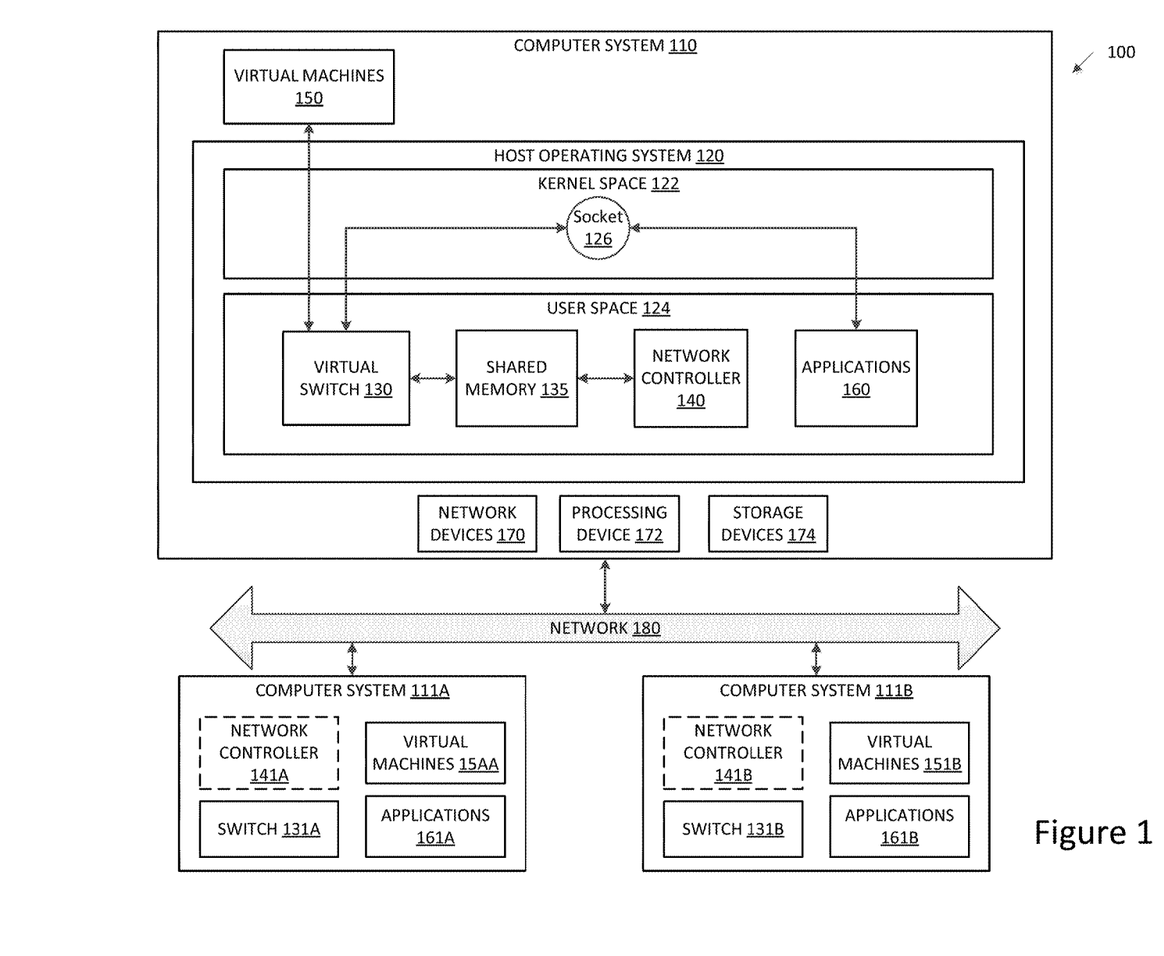
FIG. 1 is a block diagram that illustrates an example of a computer system executing a software defined network controller.

FIG. 1 is a block diagram 100 depicting an embodiment of a computing system 110 implementing a virtual switch 130 and a network controller 140. The computing system 110 may include various hardware components including a processing device 172, storage devices 174, input/output device, drivers, network devices 170 (for example, physical switches or other network devices), or the like. The storage devices 174 may be non-volatile memory, such as a hard disk drive, tape drive, flash memory, optical disc drive or the like. The computing system 110 may be a personal computer (PC), server computer, mainframe, handheld device, portable computer, set-top box or any other computing system.

The computing system 110 of FIG. 1 executes a host operating system 120. The host operating system 120 includes a kernel space 122 and a user space 124. The kernel space includes instructions that control access to and operation of network devices 170, processing devices 172, and storage devices 174. The user space is the space available to applications running on the host operating system 120. In some implementations, the host operating system 120 may operate as a hypervisor for monitoring one or more virtual machines 150. For example, the functionality of operating system 120 may be extended through the use of a loaded kernel module to perform the functions of a hypervisor. In some implementations, the host operating system 120 may be a Linux operating system extended by a kernel-based virtual machine (KVM) to perform the operations of a hypervisor. In some other implementations, the host operating system 120 may include a separate hypervisor that manages virtual machines 150 operating on the computer system 110.

The virtual machines 150 may communicate with the virtual switch 130 through virtual network interface cards (vNIC's) executing on the virtual machines. The vNIC's may have associated IP and MAC addresses and may communicate with other network devices or locations through the virtual switch 130. In some implementations, the computer system 110 may execute a variety of virtual machines. In some other implementations, the computer system 110 may not execute any virtual machines.

The virtual switch 130 may emulate physical hardware of a switch to the virtual machines operating on computer system 110. The virtual switch 130 may forward packets to other virtual machines and/or physical locations outside of the computer system 110 through network devices 170 that can connect to a network 180. Network 180 may be a Local Area Network (LAN), an intranet, an extranet, or the Internet, for instance. For example, the virtual switch may communicate through network devices 170 with computer systems 111A and 111B. Computer systems 111A and 111B may include a switch 131A, 131B, such as a virtual switch, a network controller 141A, 141B, may operate one or more virtual machines 151A, 151B, or other applications 161A, 161B. In some embodiments, there may be fewer or additional computer systems 111A, 111B or other network locations accessible through network 180. In some embodiments, the network devices 170 may be a physical network interface card (NIC).

The virtual switch 130 may distribute traffic according to a set of rules provided by the network controller 140. For example, the virtual switch may have a distribution table indicating a destination for packets based on the contents of certain fields of a packet's header. Thus, the virtual switch 130 may forward a packet according to rules defined by the distribution table if the packet matches an entry in the table. In some cases, the header of a packet may not match any entries in the distribution table. Then, the virtual switch may forward the packet to a network controller 140 in order to determine how to forward the packet.

To reduce latency in processing a packet, the virtual switch 130 may communicate with network controller 140 through shared memory 135. For example, the network controller 140 may provide instructions to the virtual switch 130 to designate a port for communications to the network controller 140. A shared memory 135 may be associated with the designated port, so that the data forwarded through the port is stored to the shared memory 135, and the network controller 140 is notified of the incoming packet. The network controller may then read the packet, determine a destination for the packet, and return the packet to the shared memory 135 with instructions for forwarding the packet. In some embodiments, the virtual switch 130 and the network controller may communicate through two shared memory buffers. For example, one shared memory buffer may be used for communications from the virtual switch 130 to the network controller 140 and a second shared memory buffer may be used for communications from the network controller 140 to the virtual switch 130. Using separate shared memory for communications in different directions may reduce the possibility of collisions of packets in the shared memory space.

In addition to providing read and write access to the network controller 140 and virtual switch 130, the shared memory may also provide a notification mechanism for the communication. For example, a notification may be generated when data is written to the shared memory 135 to inform the network controller 140 to access data at the shared memory 135 to receive a packet. In some implementations, a file descriptor may be associated with the shared memory 135. For example, the kernel of the host operating system may maintain a set of file descriptors and include a file descriptor for the shared memory 135. The file descriptor may be modified by the network controller 140 or the virtual switch 130 when a packet is stored to the shared memory. For example, the virtual switch 130 may store a packet to the shared memory and modify a particular bit in the file descriptor. In some implementations, the host operating system 120 may modify a bit in the file descriptor when an application reads or writes from the shared memory 135. The network controller may monitor the file descriptor to determine when a write to the shared memory 135 has occurred. For example, the network controller 140 may read the file descriptor to determine if it contains a bit indicating that data has been written to shared memory 135. The virtual switch 130 may monitor the same file descriptor or a different file descriptor to determine when a packet is communicated from the network controller to the shared memory 135 for the virtual switch 130.

In some implementations, a virtual switch 130 may send some communications to network controller 140 through the use of shared memory 135, but may send other communications to network controller 140 through a socket or other means of communication. For example, some communications may be sent to network controller 140 when the virtual switch 130 does not recognize a match for a particular packet. As the destination and importance of the packet may not be known, the virtual switch 130 may send the packet over the fastest communication available, that is, through shared memory 135. In other circumstances, one or more applications may send data to the network controller 140 to request changes to network configurations. In such cases, the latency of the control data reaching the network controller 140 may not be detrimental to the performance of the network. Thus, the packet may be transferred to the network controller 140 through a socket, sending temporary files, pipes, or other communication method. This may reduce the use of the shared memory 135 so that packets intended for latency sensitivity destinations are brought to the network controller 140 before those for latency tolerant applications. This may reduce any potential collisions of packets on shared memory 135, while indicating to network controller 140 to process packets received on shared memory 135 before packets received by other communication methods.

In addition to communicating to the network controller 140 through the shared memory 135, the virtual switch 130 may forward packets to other applications 160 operating in the user-space of the host operating system 120. The virtual switch 130 may forward packets to applications 160 by passing temporary files, through sockets, pipes, or other communication mechanisms. For example, as shown in FIG. 1, virtual switch 130 may forward packets to applications 160 through a socket 126. Communicating through a socket may cause a context switch between the user space and the kernel space of a hypervisor. Thus, the communication may be slower than writing to shared memory and may tie up additional system resources. In some embodiments, the virtual switch 130 may communicate with one or more applications 160 through shared memory in addition to communicating with network controller 140 through shared memory.

The network controller 140 may also communicate with virtual machines 150 or applications 160 operating on the computer system 110. For example, the virtual machines 150 and application 160 may communicate with the network controller 140 through application programming interfaces (APIs) that enable the virtual machines 150 and applications 160 to configure networking parameters or make other requests to the network controller. Communications to the network controller may be passed through virtual switch from the virtual machines or applications.

Computer systems 111A and 111B may be similar to computer system 110. For example, as shown computer system 111A executes virtual machines 151A, has a switch 131A, and executes applications 161B. In addition, computer system 111A may optionally have a network controller 141A. The network controller 141A may operate in a similar manner as network controller 140. In some embodiments, the computer system 111A may not have a network controller. In such situations, packets received at switch 131A that do not match a distribution table may be sent to the network controller 140 on computer system 110. The computer system 111A may forward packets to network controller 140 through network 180 and virtual switch 130 may forward them to network controller 140 through the use of shared memory 135. Using this configuration, the latency of updating network parameters of switch 131A for a new packet is reduced by limiting context switching and other processing of the packet at the computer system 110. In some embodiments, multiple computer systems may have network controllers capable of determining a destination for a packet. As the packet is returned to a switch with a destination indicated and the switch updated, the system may also provide an indication to other network controllers in the network of the updated network configuration such that other switches may be updated when receiving a packet with a similar header.

In some example embodiments, the computer system may execute KVM on the host operating system as the hypervisor 120. The hypervisor 120 may then operate the virtual machines 150. One or more of the virtual machines may be executed as Quick Emulator (QEMU) on the computer system 110. The virtual switch 130 may be an instance of Open vSwitch. In such embodiments, the network controller may be an instance the software defined network controller OpenFlow and may be operate in conjunction with the vSwitch to manage network communications.

Figure 2:
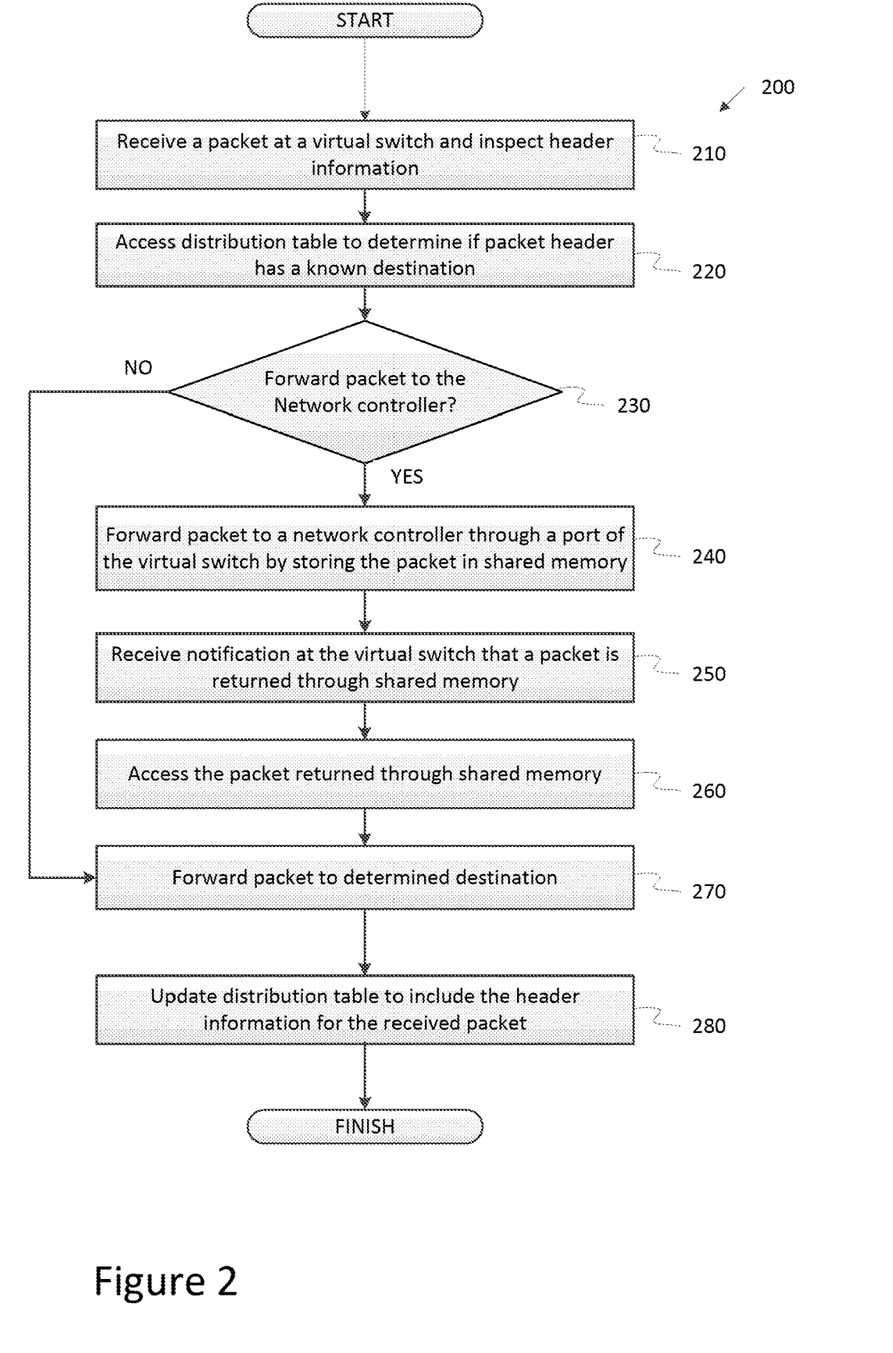
FIG. 2 is a flow diagram that illustrates an example method of distributing packets by a virtual switch, in accordance with some aspects of the disclosure.

FIG. 2 is a flow diagram illustrating an example method of processing packets by a virtual switch in accordance with one or more aspects of the present disclosure. Beginning in block 210, the virtual switch receives a packet. The packet may be received from an application running on the same computer system, may be received from a virtual network interface card of a virtual machine running on the same computer system, may be received from across a network through a physical network interface card, or may be received from another source. For example, the packet may be received from a virtual machine or an application running on the same computer system and have destination at another virtual machine running on the computer system.

At block 220, the virtual switch reads a distribution table to determine whether the header information for the packet matches an entry in the distribution table. For example, the virtual switch may have access to a distribution table or a forwarding plane that establishes IP addresses, MAC address, and ports that correspond to particular header information of the packet. Entries in the distribution table may include criteria for matching header information indicating a source Ethernet or IP port, a virtual local area network tag, a destination Ethernet or IP port, or other characteristics of a packet header. For example, different entries in the distribution table may match different portions of packet headers.

In block 230, the virtual switch determines whether to forward the packet to the network controller. For example, the virtual switch may determine whether the packet matches an entry on the distribution table. If the virtual switch identifies a match, the packet may be processed according to the rules in the distribution table. For example, the method in FIG. 2 may proceed to block 270 and the virtual switch may forward the packet according to the distribution table. If the virtual switch does not match the packet, then the method continues to determine a destination for the packet by forwarding the packet to a network controller. In certain situations, the virtual switch may also forward a packet to the network controller based on a determination that the packet matches an entry of the distribution table that indicates to the switch to forward the packets to the network controller. For example, the distribution table may indicate that all packets matching a specific pattern should be sent to a network controller. As an example, all packets that are DNS requests may be forwarded to the network controller for the network controller to perform a security check. Other examples may process packets to send to a network controller according to a different set of rules. If the virtual switch determines that the packet matches multiple entries, the entry with the highest priority may be used. In some implementations, the virtual switch may check the packet against entries in a distribution table in order of priority and stop after the first match to avoid multiple matches.

In block 240, the virtual switch forwards the packet to a network controller to determine a destination for the packet. The packet may be passed to the network controller through the use of shared memory accessible to the virtual switch and to the network controller. A shared memory buffer may be associated with the designated port, so that the data forwarded through the port is stored to the shared memory buffer, and the associated network function is notified of the incoming packet. For example, writing to the shared memory may alter a file descriptor that is monitored by the network controller.

Moving on to block 250, the virtual switch receives a notification that a packet is received at the virtual port associated with the network controller. For example, the virtual switch may monitor a file descriptor that is associated with the shared memory buffer. The network controller may modify a file descriptor when storing the packet to the shared memory. Thus, when the file descriptor is changed by the network controller writing to the shared memory, the virtual switch is notified by monitoring the file.

In block 260, after the virtual switch receives a notification that a packet is returned to the port associated with the network controller, the virtual switch reads the packet from the shared memory buffer. The packet accessed by the virtual switch in block 260 may be modified by the network controller. For example, the network controller may modify the packet including modifications to an IP address, MAC address, or a port for forwarding of the packet. In some implementations, the network controller appends the packet to include directions for actions to take to process the packet. For example, the network controller may append the packet with an action indicating that the virtual switch is to distribute the packet from a specified port. In certain situations, the network controller may drop the packet instead of providing it back to the virtual switch. In such circumstances, the method in FIG. 3 would end after forwarding the packet to the network controller. For example, if the packet does not match a destination in the network the network controller may drop the packet instead of providing a destination. As another example, the network controller may drop a packet in response to determining that the packet doesn't adhere to security policies of the network.

In block 270, the virtual switch forwards the packet to the destination indicated by the network controller or the distribution table. For example, the packet may be distributed to a port of the virtual switch specified by the network controller. Distribution of the packet may involve distribution to a virtual network interface card of a virtual machine, distribution through a physical network interface card to another network location, or distribution to an application running on the same computer system as the virtual switch.

In block 280, the virtual switch optionally updates a distribution table associated with the virtual switch to include information about a packet that previously did not match the distribution table. For example, the virtual switch may create an entry in the distribution table indicating an action to take when packets are received matching at least some fields of the header of the packets. In some implementations, the network controller may include an instruction to add a specific entry to the distribution table when providing the packet back to the virtual switch. In some embodiments, the distribution table may have been updated by a network controller and is not updated by the virtual switch. After the distribution table is updated to include a new rule, the virtual switch may forward later received packets matching the new rule through the data plane of the virtual switch without forwarding the packet to the network controller. This may reduce latency for subsequent packets and also reduce processing by the system. In some implementations, the distribution table may be located in a shared memory location such that the network controller may update the table when analyzing packets received from the virtual switch.

Figure 3:
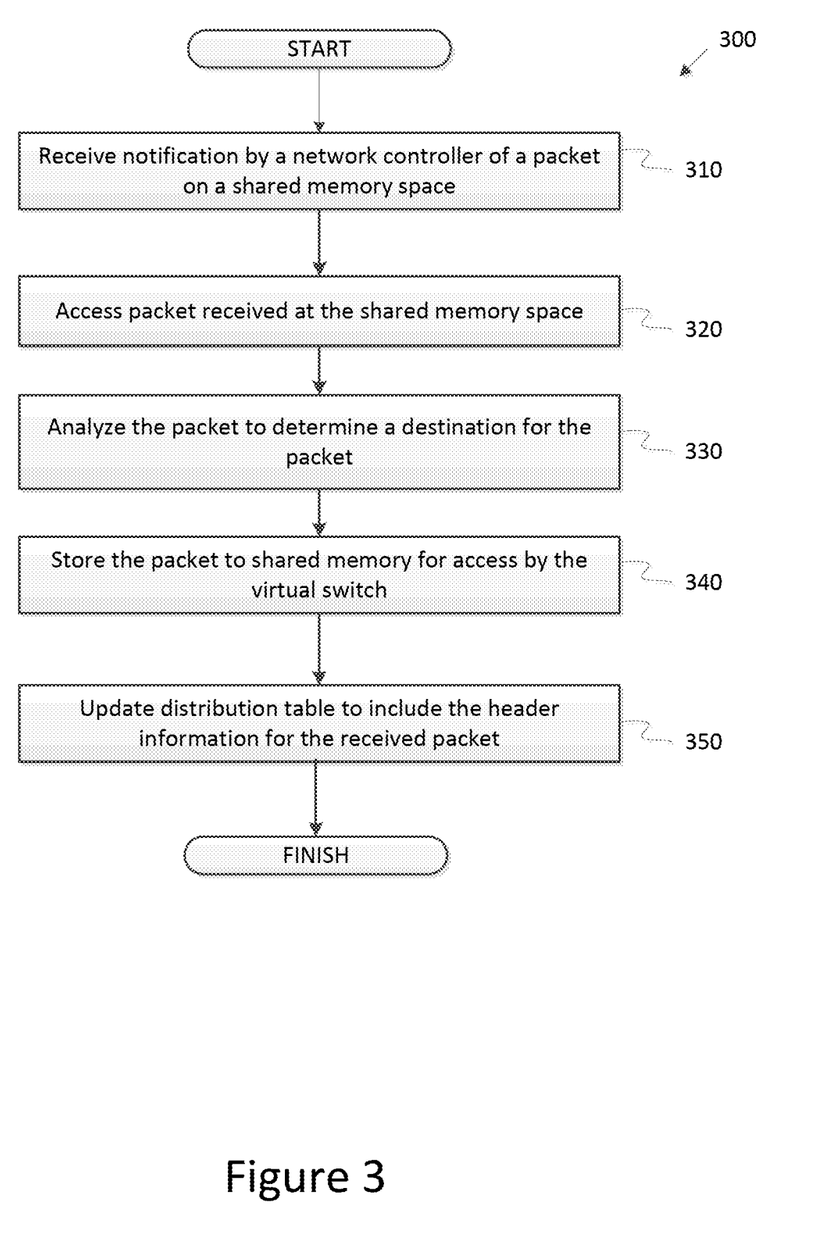
FIG. 3 is a flow diagram that illustrates an example method of distributing packets by a network controller, in accordance with some aspects of the disclosure.

FIG. 3 is a flow chart of processes performed by a network controller to analyze a packet received from a virtual switch. Beginning in block 310, the network controller receives a notification that a packet has been stored in a shared memory buffer. For example, the network controller may read a file descriptor and determine that a bit on the file descriptor indicates that a virtual switch stored a packet to a shared memory buffer.

In block 320, the network controller reads the packet at the shared memory buffer. For example, the network controller may perform a read instruction from the shared memory buffer or a portion of the shared memory buffer containing the packet. In some embodiments, the shared memory buffer may hold more than one packet, and the network controller may access the next packet in a queue of packets at the shared memory buffer.

In block 330, the network controller analyzes the packet to determine the destination for the packet. For example, the network controller may inspect the packet's header or payload to determine a destination for the packet. The network controller may rely on instructions received from one or more applications running on the same computer system, or on instructions received from other network locations. For example, an application or virtual machine operating on the computer system of the network controller may communicate with the controller through an API or other communication mechanism that provides information to the controller about changes, or requested changes, to network parameters. For example, if a virtual machine changes an IP or MAC address, the change may be communicated to the network controller through an API. If the virtual switch is not updated with the new information, then when a packet is received at the virtual switch it is forwarded to the network controller to determine the appropriate destination. As another example, a new application or virtual machine may communicate to the network controller when it is instantiated to establish networking parameters. In some embodiments, the network controller may modify the packet to indicate a destination to the virtual switch. For example, the network controller may specify, in the header of the packet, a port for the virtual switch to forward the packet.

In block 340, the network controller stores the packet back into a shared memory buffer with instructions for the virtual machine to process the packet. For example, the packet may be appended with directions for actions for the virtual switch to take to process the packet. In some implementations, the network controller may provide direction in a communication separate from the packet, but also stored in the shared memory buffer. If the packet was modified by the network controller, the modified packet is stored back to the shared memory buffer. The shared memory buffer may be the same shared memory buffer as was used to receive the packet or a different shared memory buffer. In some embodiments, the shared memory buffer may include distinct memory blocks that can be used for incoming or outgoing packets. The network controller may provide a notification to the virtual switch when the packet is stored into shared memory. For example, the network controller may modify a file descriptor associated with the shared memory buffer. Optionally, in block 350, the network controller updates the distribution table used by the virtual switch to determine destinations for packets. This may enable the virtual switch to forward later received packets with the same or similar header information through the data path of the virtual switch without passing the packet to the network controller in the control path. In some implementations, the network controller provides instructions to the virtual switch to update a distribution table with a new rule for processing packets.

Figure 4:
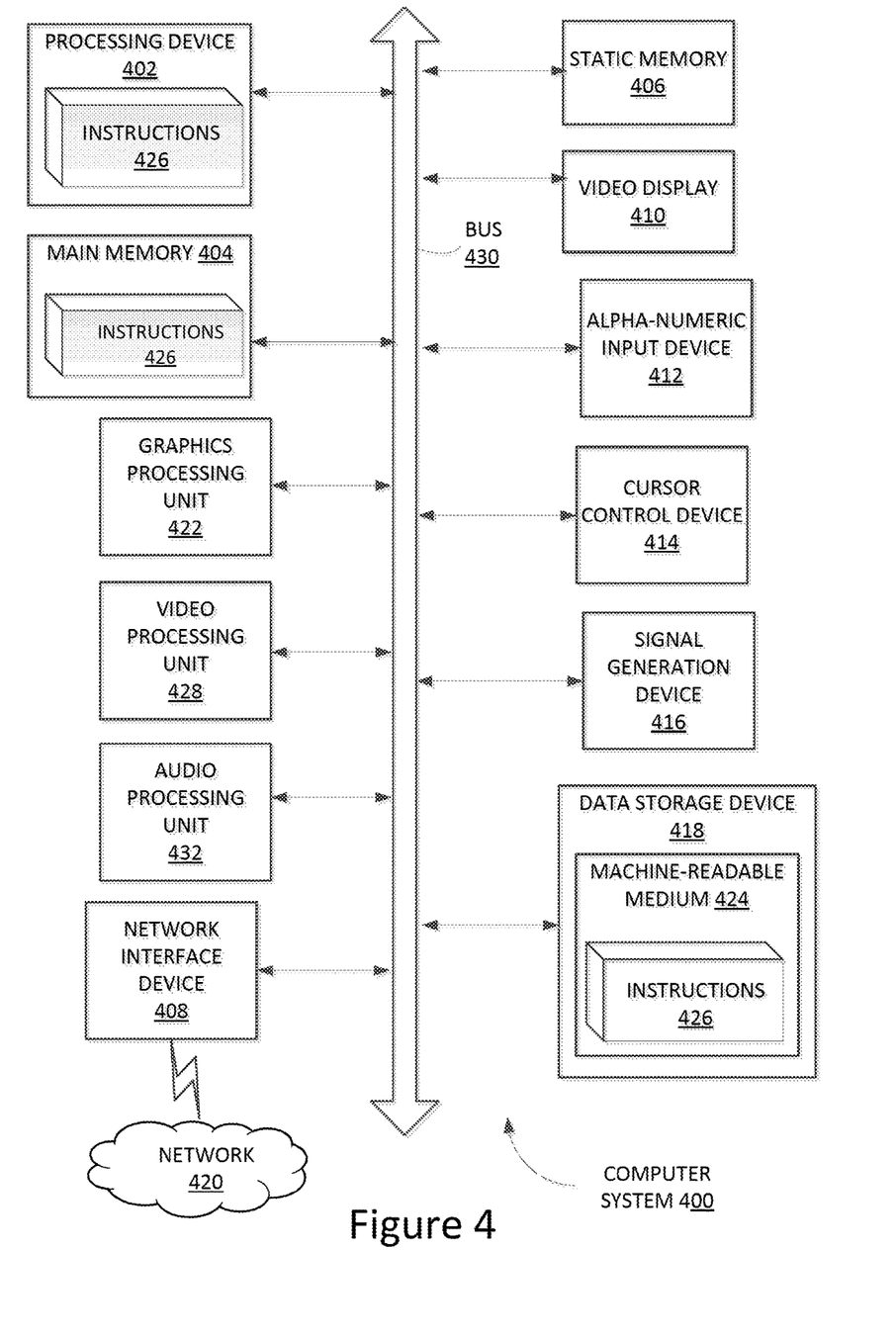
FIG. 4 illustrates an illustrative computer system operating in accordance with one or more aspects of the present disclosure.

FIG. 4 illustrates a diagrammatic representation of a machine in the exemplary form of a computer system 400 within which a set of instructions, for causing the machine to perform any one or more of the methodologies discussed herein, may be executed. The computer system 400 may correspond to the computer system 110 of FIG. 1. In some embodiments of the present invention, the machine may be connected (e.g., networked) to other machines (e.g., other computer systems in a network with computer system 110) in a Local Area Network (LAN), an intranet, an extranet, or the Internet. The other machines may correspond to computer systems 111A and 111B of FIG. 1, for example. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device), which communicate with each other via a bus 408.

The processing device 402 represents one or more processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU (computer processing unit), a multi-core CPU and a massively multi-core system that includes many interconnected integrated circuits, each of which may include multiple processor cores. The processing device 402 may therefore include multiple processors. The processing device 402 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, system on chip (SoC), or the like. The computer system 400 may include a graphics processing unit 422, a video processing unit 428, and an audio processing unit 432.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-readable storage medium (or more specifically a computer-readable storage medium) 424 on which is stored one or more sets of instructions 426 embodying any one or more of the methodologies or functions described herein (e.g., virtual switch 130, network controller 140, virtual machines 150, or the like). The instructions 426 may also reside, completely or at least partially, within the main memory 404 and/or within the processing device 402 during execution thereof by the computer system 400, the main memory 404 and the processing device 402 also constituting machine-readable storage media. Main memory 404, or data storage device 418 may include a shared memory space for communication between various components executed by instructions as described herein (e.g., to enable communication between virtual switch 130 and network controller 140 through shared storage 135 as discussed with reference to FIG. 1).

While the computer-readable storage medium 424 is shown in an exemplary embodiment to be a single medium, the term "computer-readable storage medium" (or "computer-readable medium") should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies disclosed herein. The term "computer-readable storage medium" shall accordingly be taken to include, but not be limited to, non-transitory media such as solid-state memories, and optical and magnetic media.

The modules, components and other features described herein (for example in relation to FIG. 1) can be implemented as discrete hardware components or integrated in the functionality of hardware components such as ASICS, FPGAs, DSPs, SoCs, or similar devices. In addition, the modules can be implemented as firmware or functional circuitry within hardware devices. Further, the modules can be implemented in any combination of hardware devices and software components, or only in software.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "adding", "receiving", "determining", "routing", "performing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first", "second", "third", "fourth", etc. as used herein are meant as labels to distinguish among different elements and may not necessarily have an ordinal meaning according to their numerical designation.

Embodiments of the present invention also relate to an apparatus for performing the operations herein. This apparatus may be specially constructed for the required purposes, or it may comprise a computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various computer systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
receiving, by a virtual switch application being executed by a processing device, a packet comprising a header;
determining, by the processing device, that the packet does not match an entry in distribution table associated with the virtual switch application;
storing, by the processing device, the packet to a shared memory buffer that is accessible to the virtual switch application and a network controller application being executed by the processing device;
receiving, by the processing device, a notification that the packet is stored in the shared memory buffer; and
forwarding, by the processing device, the packet to a destination determined by the network controller.

2. The method of claim 1, further comprising:
receiving, by the network controller, notification that the packet has been written into the shared memory butler;
determining, by the network controller, the destination for the packet received at the shared memory buffer space;
modifying, by the network controller, the packet to generate a modified packet; and
storing, by the network controller, the modified packet to the shared memory buffer.

3. The method of claim 2, wherein determining the destination of the packet comprises modifying, by the network controller, the distribution table of the virtual switch.

4. The method of claim 1, wherein the virtual switch and the network controller are user-space applications of a host associated with the processing device.

5. The method of claim 1, further comprising notifying the network controller of the packet having been stored in the shared memory buffer.

6. The method of claim 1, wherein the shared memory buffer is associated with a user-space of a host operating system being executed by the processing device.

7. A system comprising:
a memory;
a processing device operatively coupled to the memory, the processing device to execute a virtual switch to:
receive a packet comprising a header;
store the packet to a shared memory buffer accessible to the virtual switch and a network controller executed by the processing device;
receive a modified packet from the network controller; and
forward the modified packet according to a direction received from the network controller.

8. The system of claim 7, wherein the processing device is to store the packet to the shared memory buffer in response to determining that the packet does not match any entries of a distribution table or that the packet matches an entry of the distribution table that indicates to the switch to forward the packets to the network controller.

9. The system of claim 7, wherein the processing device is further to:
receive, by the network controller, a notification that the packet has been stored in the shared memory buffer;
determine a destination for the packet received at the shared memory buffer;
modify, by the network controller, the packet to generate the modified packet; and
store, by the network controller, the modified packet to the shared memory buffer.

10. The system of claim 9, wherein to modify the packet comprises appending the packet with the direction to the virtual switch, wherein the direction indicates to the virtual switch to forward the packet to a specified port.

11. The system of claim 9, wherein to determine a destination for the packet comprises the processing device to modify the distribution table of the virtual switch.

12. The system of claim 7, wherein the processing device is further to:
receive, by the network controller, a notification that the packet has been written into the shared memory buffer;
determine, by the processing device, a destination for the packet received at the shared memory buffer;
modify, by the network controller, the packet to generate a modified packet; and
store, by the network controller, the packet to a second shared memory buffer, wherein the second shared memory buffer is accessible to the virtual switch.

13. The method of claim 7, wherein the virtual switch and the network controller are user-space applications of a host associated with the processing device.

14. A non-transitory machine-readable storage medium comprising instructions that, when accessed by a processing device, causes the processing device to:
receive, by the processing device executing a virtual switch, a packet comprising a header;
store, by the processing device, the packet to a shared memory buffer accessible to the virtual switch and a network controller executed by the processing device;
receive a modified packet from the network controller; and
forward the modified packet according to a direction received from the network controller.

15. The non-transitory machine-readable storage medium of claim 14, wherein the instructions cause the processing device to store the packet to the shared memory buffer in response to determining that the packet does not match an entry on a distribution table associated with the virtual switch or that the packet matches an entry of the distribution table that indicates to the switch to forward the packets to the network controller.

16. The non-transitory machine-readable storage medium of claim 14, wherein the instructions further cause the processing device to:
receive, by the network controller, a notification that the packet has been written into the shared memory buffer;
determine, by the processing device, a destination for the packet received at the shared memory buffer;
modify, by the network controller, the packet to generate the modified packet, and
store, by the network controller, the modified packet to the shared memory buffer.

17. The non-transitory machine-readable storage medium of claim 14, wherein the instruction further cause the processing device to store a direction, by the network controller, to the shared memory buffer to cause the virtual switch to distribute the modified packet to a specified port.

18. The non-transitory machine-readable storage medium of claim 14, wherein the instruction further cause the processing device to update a distribution table of the virtual switch in response to determining a destination for the packet.

19. The non-transitory machine-readable storage medium of claim 14, wherein the virtual switch and the network controller are user-space applications of a host associated with the processing device.

20. The non-transitory machine-readable storage medium of claim 14, wherein the instructions further cause the processing device to execute the virtual switch comprises instructions to cause the processing device to execute Open vSwitch.

\* \* \* \* \*